Figure 1:
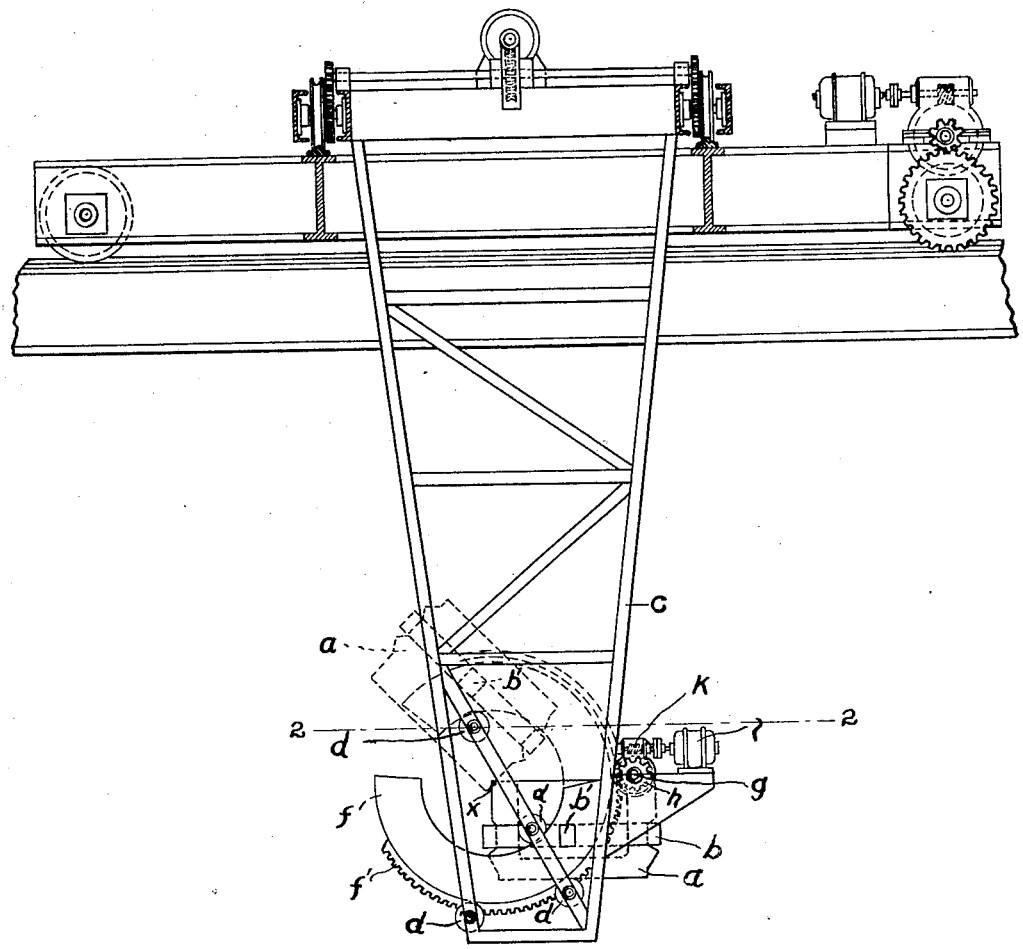

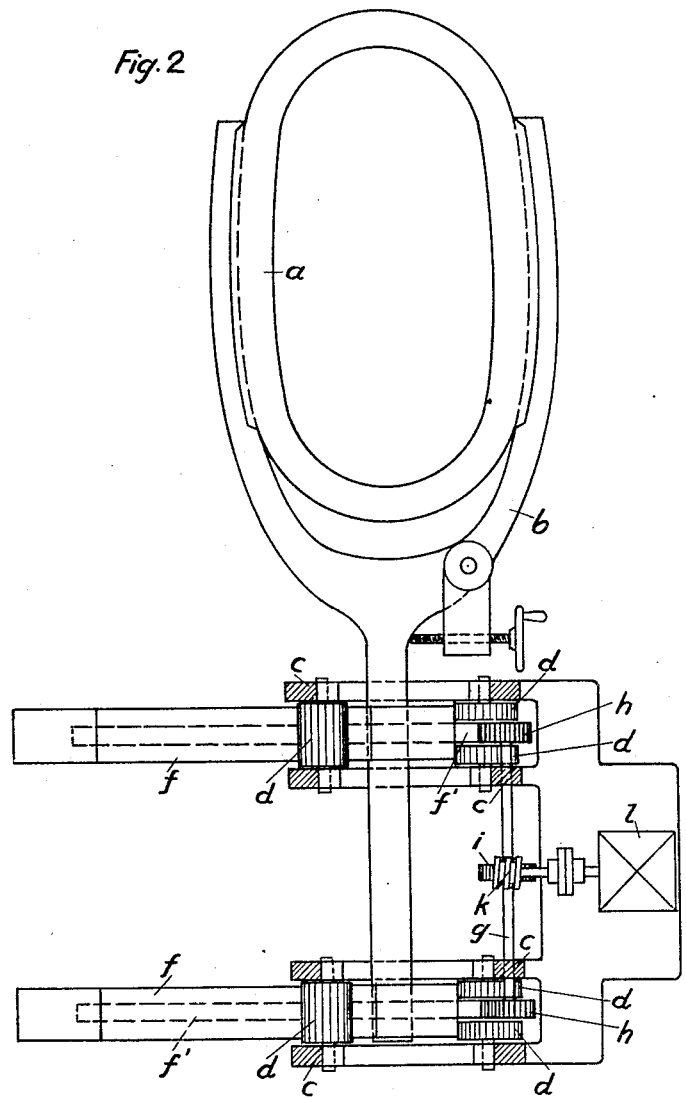

Patented Feb. 2, 1932

1,843,179

UNITED STATES PATENT OFFICE

WILHELM SPIEKERMANN, OF HERZOGENRATH, GERMANY, ASSIGNOR, BY MESNE ASSIGNMENTS, TO THE AMERICAN BICHEROUX COMPANY, A CORPORATION OF DELAWARE

DEVICE FOR EMPTYING GLASS MELTING POTS

Application filed September 10, 1929, Serial No. 391,642, and in Germany July 3, 1929.

This invention relates to the manufacture of high grade plate glass by pouring molten glass from a pot onto a casting or rolling table or onto a receiver or roll of a glass rolling machine on which it is brought into shape, and it has more particularly reference to the mode of emptying the melting pot for the pouring out of the glass described in the patents to Max Bicheroux Nos. 1,673,098 and 1,673,138, according to which the pot is emptied "en masse" by positioning the pot near and aside of the table, receiver or other support and turning it as a whole about a horizontal axis located near the upper pouring edge of the pot and slightly above the support.

The invention has for its object to provide a modified form of device of simple and efficient construction for accomplishing this mode of emptying the pot, this device having no longer a pot gripping fork with an offset or cranked shaft, but an ordinary pot fork with a straight shaft, this shaft being rigidly supported by a pair of parallel segments which are mounted for vertical up and down movement about the tilting axis of the pot in the pot transporting apparatus.

The invention further consists in a suitable driving mechanism for imparting the desired movements to the fork-carrying segments, this mechanism including a worm gear which is self-locking, so that the pot can be securely held at any point of its tilting path without the use of special locking means.

An embodiment of the subject-matter of the invention is illustrated in the accompanying drawings, in which Fig. 1 is a side elevation of the device and Fig. 2 a horizontal section on the line 2—2 of Fig. 1.

Referring to the drawings, $a$ denotes a glass melting pot, $b$ is the pot gripping fork and $c$ is the lower portion of a travelling crane used for the transport of the pot. The fork $b$ may have the form and construction of the forks commonly used for inserting and withdrawing the pots from the melting furnace, but it may also have any other proper form.

The frame of the crane $c$ is provided with a number of guide rollers $d$, between which two parallel arc-shaped segments $f$ are mounted for rotary up and down movement in vertical planes. The guide rollers $d$ are arranged with relation to each other in such a manner that the segments $f$ when moved turn about the tilting axis $x$ of the pot, which is located in or near the upper pouring edge of the pot. The fork $b$ has a straight shaft $b'$ preferably of square section. It is rigidly mounted by this shaft in the segments $f$ so that when these segments turn about the axis $x$, the fork and pot are likewise turned about the same. The segments $f$ are provided on their outer peripheral edge with teeth $f'$ which are in engagement with pinions $h$ fastened on a common shaft $g$. The shaft $g$ further carries a worm wheel $i$ with which meshes a worm $k$ which is driven through a motor $l$ supported on the crane $c$.

The operation of the described device is as follows: When the gripping fork $b$ has taken a pot, for instance by withdrawing it directly from a melting furnace, the crane $c$ carries the pot to the emptying place, that is to say to a casting table or the receiver of a rolling machine. When in proper position at the machine, the motor $l$ is started whereby motion is imparted to the described gear parts $k, i, g, h, f'$ and segments $f$, which cause the pot $a$ to be tilted about the axis $x$ from the position indicated by full lines into the position indicated by broken lines, Fig. 1. Upon the pot having been emptied by this tilting movement, the motor $l$ is reversed and the pot thereby returned to its horizontal position, whereupon it is carried back by the crane to the melting furnace.

Having thus described my invention, what I claim as new and desire to secure by Letters Patent, is:—

1. A device for emptying glass melting pots, comprising in combination a pot transporting device, a pair of parallel segments mounted in the transporting device in vertical planes for turning movement about a horizontal axis, a pot gripping fork with a straight shaft rigidly supported by the said segments so that the upper pouring edge of the pot is located near the said horizontal axis, and means for imparting movement to the said segments so as to cause them and the melting pot to be turned about the said horizontal axis.

2. A device for emptying glass melting pots, comprising in combination a traveling pot transporting crane, a plurality of guide rollers in the crane, a pair of parallel toothed segments mounted between the said guide rolls for turning movement about a horizontal axis, pinions meshing with these toothed segments, a power driven worm gearing for operating the said pinions, and a pot gripping fork with a straight shaft rigidly supported by the said segments so that the upper pouring edge of the pot is located near the said horizontal axis.

In testimony whereof I have signed my name to this specification.

WILHELM SPIEKERMANN.